Patented Nov. 23, 1937

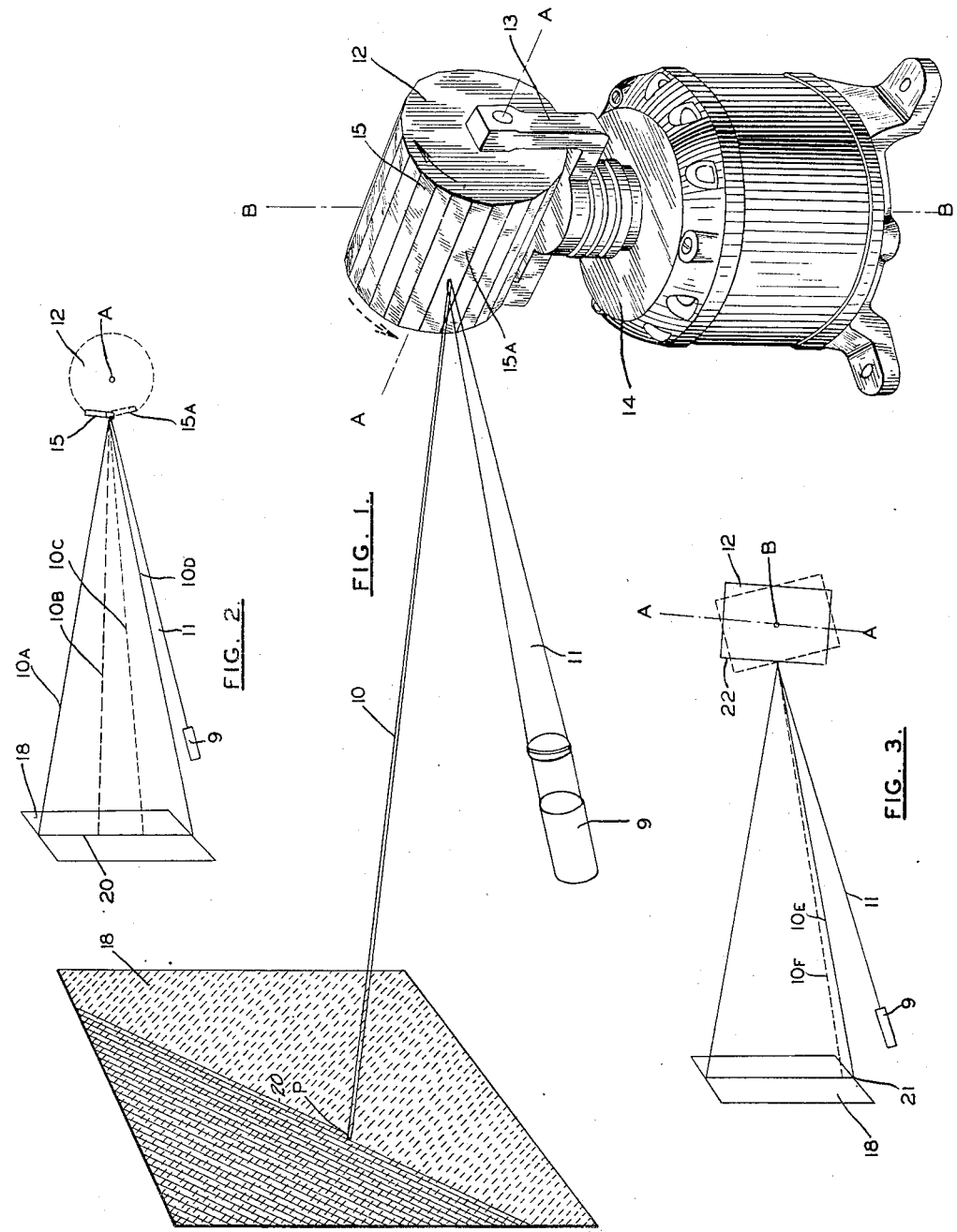

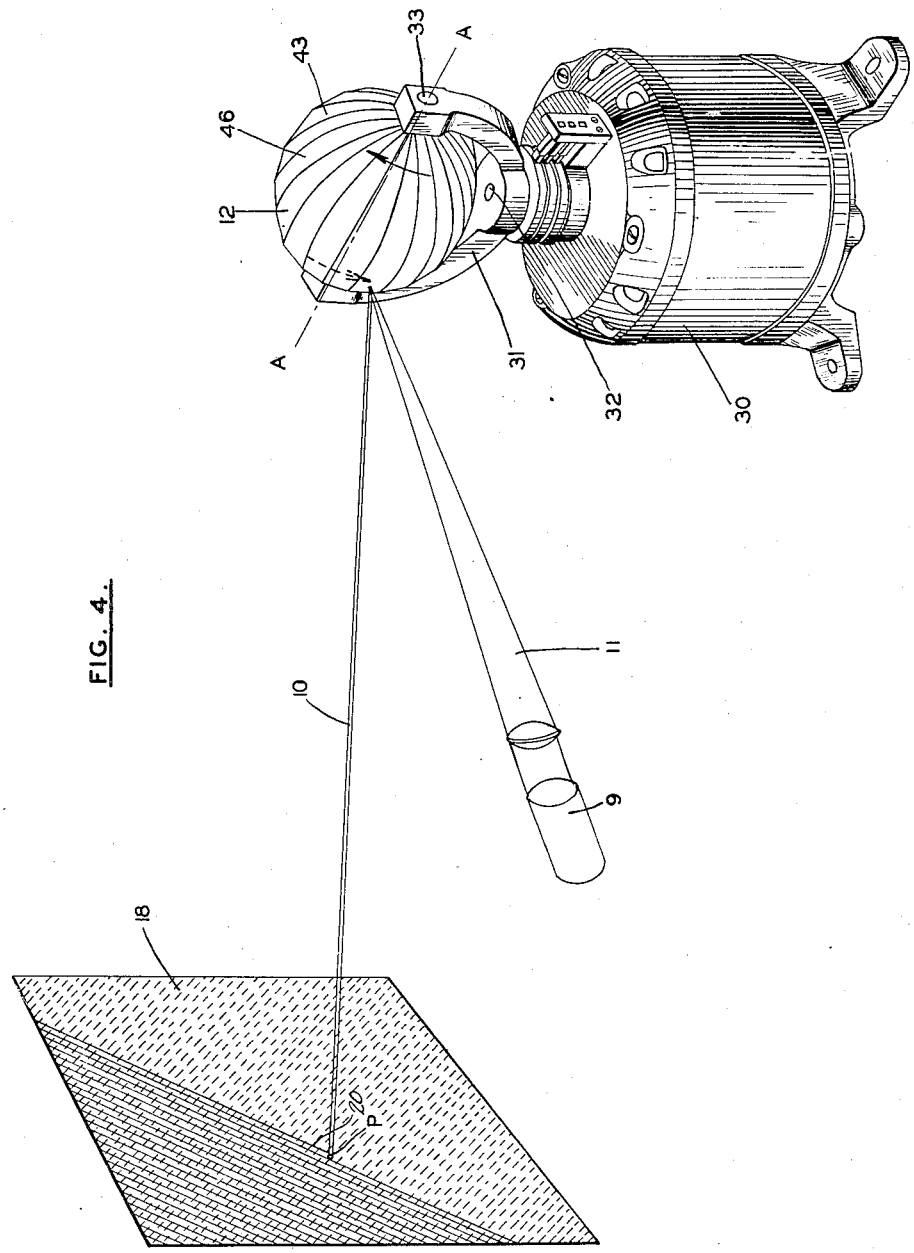

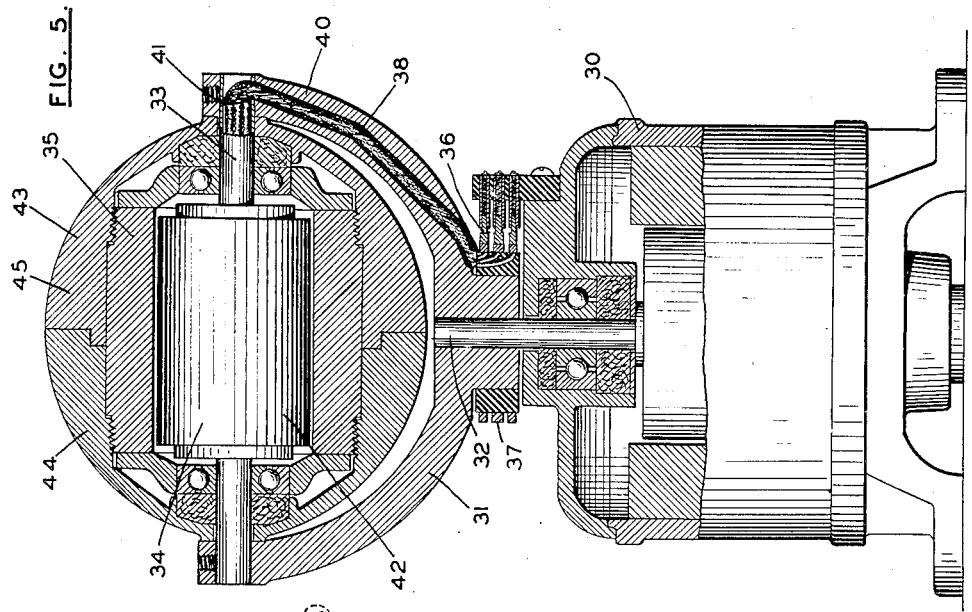
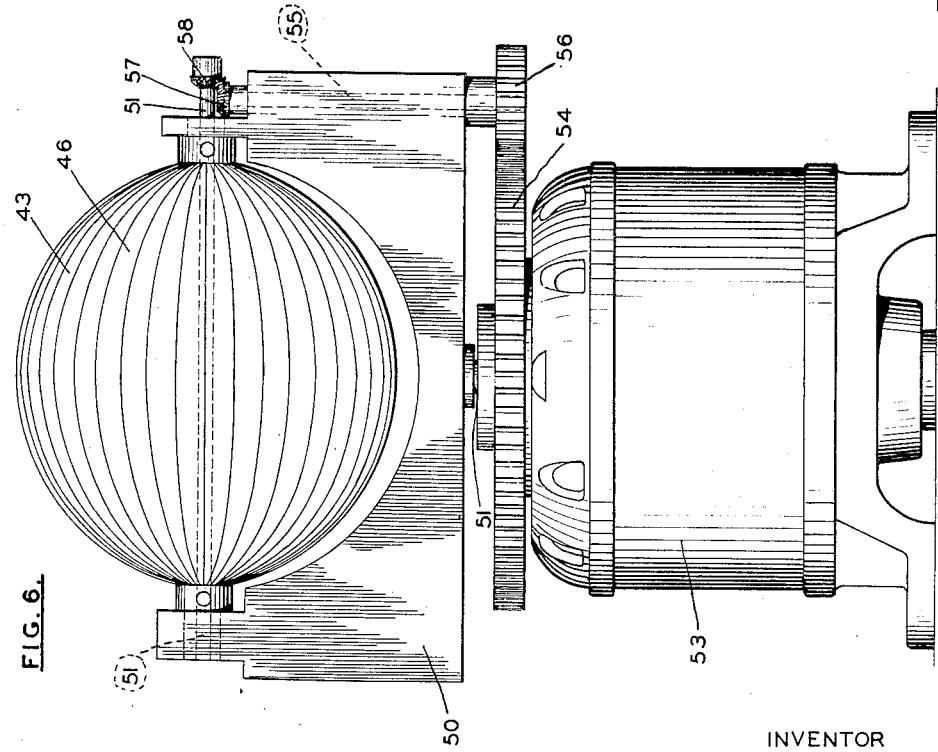

2,099,872

UNITED STATES PATENT OFFICE 2,099,872

SCANNING DEVICE

Milton M. Stern, Los Angeles, Calif.

Application February 26, 1934, Serial No. 712,913
Renewed October 19, 1936

7 Claims. (Cl. 178—7.6)

My invention relates to a scanning device suitable for use in television.

Although the present invention is suited for use with many methods wherein an image is disintegrated at one point and then assembled or integrated at another point, the principal utility at present perceived for the invention is in television, and it is therefore thought that the purpose of disclosing the features thereof may be best served by limiting the description and drawings to forms of the invention expressly designed for television use.

The detail or definition to be obtained in a scene or image transmitted by television depends upon the number of lines into which the image is divided. Present structural characteristics appear to impose definite limitations upon the number of lines which may be produced on a given area. The principal object of my invention is to provide a device which will produce a large number of lines on a given area, which device constitutes a marked simplification over the art as it is now practiced, and which may be relatively economically manufactured and likewise easily operated.

An object of the invention is to provide a method of scanning, which consists in the movement of a mirror or a plurality of mirrors relative to two angularly disposed axes, in such a manner that an image may be disintegrated and the light values of the different parts thereof transformed into other forms of energy, such as electrical modulations, and whereby such modulations of energy may be subsequently impressed upon a light beam fluctuating in accordance with the modulations, which light beam may be reassembled or integrated into the form of a projected image in duplicate of the original image.

It is an object of my invention to provide a method and means of scanning, wherein images may be transmitted with such rapidity that the motion of the consequent elements of an image will be clearly and smoothly shown in the reproduction or projection of an image on a screen.

It is a further object of the invention to provide a scanning device having a plurality of light directing elements, such as mirrors or reflectors, disposed so as to revolve around a primary axis and also relative to a secondary axis disposed at an angle to the primary axis. The simple form of the invention consists of mirrors placed on a body so as to define a cylinder. As this body is rotated so that the mirrors will revolve around the axis thereof, the beam of light reflected by each mirror as it passes through a position to receive a projected beam will swing through a plane transverse to the axis of the body, the plane or path of the reflected beam produced by each of the mirrors coinciding. In order to offset the paths of the consecutive beams, means are provided for relatively slowly rotating the body on an axis which is preferably perpendicular to the axis of the body. In the preferred practice of my invention, however, the reflectors are curved in such a manner that the end portions thereof converge toward the axis of rotation around which the mirrors revolve.

It is a further object of the invention to provide a simple means for producing a composite rotation of the reflectors, comprising a pair of synchronous motors, one of which is disposed within the body upon which the mirrors are mounted.

It is a further object of the invention to provide a device of the character set forth in the preceding paragraph, in which the mirrors are mounted upon a hollow motor rotor disposed around a central stator.

Further objects and advantages of the invention will be made evident throughout the following part of the specification.

Referring to the drawings, which are for illustrative purposes only,

Fig. 1 is a somewhat diagrammatic view showing a simple form of my invention and a manner of its use.

Fig. 2 is a side view for illustrating the effect produced by one of the movements of each reflector.

Fig. 3 is a schematic plan view showing the effect produced by the secondary movement of each reflector.

Fig. 4 is a perspective view showing the preferred form of my invention, in which the reflectors are curved so as to define a body of oval cross section.

Fig. 5 is a vertical cross section, to enlarged scale, through the scanning device shown in Fig. 4.

Fig. 6 is an elevational view showing an alternative method of driving the scanning device.

In Fig. 1, which is employed for exposing the general principles of my invention, I show primary and secondary light beams 10 and 11, either one of which may be considered a reflection of the other, depending upon whether the device is used for disintegrating or integrating an image. The form of scanning device shown in Fig. 1 includes a cylindrical body 12 carried by a yoke 13 so as to rotate on a primary axis A—A, such yoke 13 being supported upon a casing 14 in a manner to rotate on a secondary axis B—B. As will be hereinafter clearly shown, there are several means whereby the body 12 may be driven so as to rotate on the axis A—A and whereby the yoke 13 may be rotated on the axis B—B, thereby producing a rotational movement of the body 12 relative to the axes A—A and B—B. Upon the cylindrical surface of the body 12 light directing elements 15 are formed, which may consist of flat reflective faces formed directly upon the body 12 or by the application of strips or mirrors of strip form to the surface thereof. In the simple practice of the invention the reflectors 15 are flat and are elongated with respect to the axis A—A, as well as being disposed parallel and tangential with relation thereto. For purpose of explanation, let it be assumed that the beam 11 is originated in a light producing means 9 which in television embodies means for modulating such light beams in accordance with a pattern received from a television transmitting station. The light beam 11 is projected toward the body 12 so that as the reflectors 15 revolve around the axis A—A, they will consecutively intercept the beam 11 and reflect such beam 11 so as to produce a reflected beam 10. The beam 11 being stationary, the change in the angular relation of each reflector 15 relative thereto will cause the reflected beam 10 to swing through a plane which is transverse to the primary axis A—A. Accordingly, if a screen 18 is set up so as to intercept the beam 10, such beam 10 will travel across the screen nearly vertically and will inscribe a line or path 20 thereon.

Illustrative of this, I have shown a reflector 15 mounted upon a cylinder 12 so as to rotate on the axis of the cylinder indicated by the letter A. With the reflector 15 in the position in which it is shown in full lines in Fig. 2, the incidental beam 11 will be reflected and produce a beam 10a extending from the mirror 15 to the screen 18. As the cylinder or body 12 rotates in anti-clockwise direction, the angle of incidence of the beam 11 relative to the mirror 15 will change so that as the reflector 15 rotates downwardly, the reflector beam of light will pass through the consecutive positions 10b, 10c, and will finally reach the position 10d when the reflector 15 reaches the position indicated by dotted lines 15a. Accordingly, the reflected beam of light will transcribe a path or line 20 on the screen. Now, if the yoke 13 is held stationary, each of the mirrors 15 will reflect a beam 10 through the same plane or path as the reflected beam above described, and the consecutive beams will all transcribe a line 20 on the screen 18 in the same position. By relatively slowly rotating the yoke 13, and likewise the system of reflectors 15, on the secondary axis B—B, I cause the reflected light beam 10 produced by each consecutive mirror to be laterally offset relative to the preceding light beam so that each consecutive light beam will transcribe its own line or path 20 on the screen 18 in a position adjacent the preceding line 20. The result of this composite rotation of the reflectors 15 is the inscribing of separate paths or lines of light from one edge to the other of the screen 18. Whether these lines 20 are to extend vertically or longitudinally depends upon the longitudinal or vertical positioning of the axis A—A. With the axis A—A in a horizontal plane, as shown in Fig. 1, the lines 20 will be formed vertically upon the screen 18. By turning the axis B—B from vertical to horizontal position, horizontal lines 20 may be produced upon the screen. To clearly illustrate the secondary movement of the reflectors 15, I have in Fig. 3 shown the body 12 in plan view, in such position that the incidental beam 11 will be reflected by one of the reflectors 15 so as to produce a reflected beam 10e in an approximately vertical plane coinciding with the edge 21 of the screen 18. As the body 12 revolves in clockwise direction on the secondary axis indicated by B toward the dotted line position 22, the succeeding reflector 15 will reflect a beam 10f through a nearly vertical plane adjacent the plane of the beam 10e, and as the secondary movement of the body 12 continues in timed relation to the primary rotation thereof, each consecutive reflector 15 will swing horizontally through a small angle around the secondary axis indicated by B in Fig. 3 and B—B in Fig. 1, and consequently the vertical planes through which the reflected beams pass will be offset in horizontal direction in a regular manner from one side to the other of the screen 18. The foregoing action of producing vertical lines from one side to the other of the screen 18 is considered a single frame in motion picture and television projection in that it constitutes a taking or formation of a complete image. After the completion of the single frame, the rotation of the body 12 on the axis B—B continues in clockwise direction through a sufficient angle to bring the opposite side of the body 12 into position to again reflect light through the paths 10 and 11 by mirrors which are moving upwardly instead of downwardly as shown in Fig. 2. Accordingly, each complete revolution of the body 12 on the axis B—B produces two complete images or frames, in one of which frames the lines are drawn downwardly and in the other of which frames the lines are drawn upwardly.

It is important to note that the downward drawn lines and the upward drawn lines are inclined in opposite directions so that when the lines of two consecutive frames are superimposed, the lines of one frame intersect the lines of the other. As a result of the intersecting, the linear effect of scanning is less apparent than usual to the observer and a better image is obtained by a given number of lines than may be obtained without such intersecting. The intersecting effect is made possible by the fact that the reflecting body rotates completely about its secondary axis. Thus, in Fig. 1, as well as in Fig. 4, when the mirror rotates in the direction indicated by the solid arrow, the screen is scanned diagonally as indicated by the inclined solid lines; when the secondary axis has been rotated 180° to cause the mirrors to rotate in the direction indicated by the dotted arrow, the screen is scanned as indicated by the inclined dotted lines.

From the foregoing it will be perceived that the position of the beam 10 is determined by the position of a mirror or reflector 15 cooperating therewith. Accordingly, light may start from a point P on the screen 18, Fig. 1, and pass through the beam 10 to the reflector indicated specifically as 15a and then be reflected through the path of the beam 11 to the device 12 which may consist in this use of the invention of a means for modulating an electrical flow in accordance with the modulations of light received thereby. Accordingly, if the screen 18 has a picture or image thereon, and such screen 18 is lighted so that light will be reflected from the image on the screen 18 to the scanning device, such scanning device, through the composite rotary movement of the reflectors 15 thereof, will segregate lines of light from the image on the screen 18, or, in other words, will disintegrate the image and reflect the same to the device 12. This practice of disintegrating or scanning an image is what is known as the "camera" method. The device shown in Fig. 1 may be employed in other manners of scanning, such, for instance, as the "flying spot" method. In other words, the characteristic movement of the reflectors 15 results in the defining of prescribed paths 10 and 11 through which light energy may flow to or from the member 12, the path 11 being always fixed and the path 10 being constantly in motion in the characteristic manner hereinbefore described, so that the leftward end of the path 10 transcribes consecutive lines on the screen 18 regardless of whether light is being taken from the screen 18 or is being projected thereonto.

It will be perceived that the relative speeds of rotation of the member 12 on the axes A—A and B—B must be determined in accordance with the movement of reflectors 15 disposed around the axis of rotation A—A. The rotation may be accomplished by gear trains or by mounting a motor in the casing 14 and a second motor within the body 12, these motors being operated in synchrony so as to produce desired speeds of rotation around the axes A—A and B—B. In Fig. 4 I show a modified form of the invention employing a vertically disposed motor 30 having a yoke 31 mounted on the upper end of its shaft 32. Secured in the upper ends of the yoke is an axle member 33 which supports, as shown in Fig. 5, a motor stator 34 around which a rotor 35 is assembled. Through the use of brushes 36, electrical energy is transmitted to rings 37 mounted upon the yoke 31. Electrical energy is then carried from the rings 37 by means of conductors 38, through one of the arms 40 of the yoke 31, and through openings 41 in the shaft 32 into the motor stator 34 which cooperates with the rotor 35 to form a motor 42. The motors 30 and 42 are of synchronous type and, being energized from the same source of alternating current, will operate in synchrony at the respective speeds for which they are designed.

On the rotor 35 of the motor 42 a ball-like shell 43 consisting of cooperating parts 44 and 45 is mounted, the outer portion of the member or body 43 having light controlling or directing means 46 formed thereon which preferably consist of reflective faces or reflectors which are elongated in the direction of the axis of rotation A—A defined by the axle 33, are tangential with respect to such axis, and are so curved that the ends thereof converge with respect to the axis A—A. The faces or reflectors 46 due to their curvature, as described, must have a characteristic shape which may be referred to as "lemon peel shape". These faces 46 are widest at the centers thereof and are gradually reduced in width toward the ends thereof. The body 43 rotates relative to the axes A—A and B—B as does the body 12 of Fig. 1, and the reflective faces 46 have the same function as the reflectors 15, in that they, by the characteristic change in the angular position thereof, produce a definite relation between beams or paths 10 and 11 in such a manner that the leftward end of the path 10 will transcribe consecutive adjacent lines offset laterally across the screen or image 18. By curving the reflectors or reflecting faces 46, the time lapse between consecutive frames or images may be materially reduced, and accordingly the form of rotating body 43 shown in Figs. 4 and 5 is believed superior to the simple cylindrical form shown in Fig. 1, since a greater rotation of the body 43 on the axis B—B is required to produce the change in the angle of reflection necessary to carry the consecutive light beam 10 laterally across the screen 18. It will be recognized that the curvature of the reflecting faces 46 will vary with the width of the screen 18, and that the curvature for any given condition of operation may be readily determined either experimentally or mathematically.

By virtue of the fact that the mirrors are curved to converge at their ends, light is reflected to or from the screen or image 18 during a greater number of degrees of rotation of the reflecting body about its vertical axis than would be possible were the reflecting surfaces not convergent. Consequently, the "dead" interval between frames required for transition past the ends of the mirrors is greatly reduced. It is also to be noted that since curving of the mirrors reduces the ratio between the rate of lateral movement of the beam and rate of rotation of the mirrors about the secondary or vertical axis, closer scanning for a given rate of such rotation is achieved.

In Fig. 6 I show an alternative method of producing a desired composite rotation of the reflector body 43 or any other type of reflector body coming within the teachings of this disclosure, such, for instance, as the cylindrical type shown in Fig. 1. In this practice the body 43 is supported in a yoke 50 by means of axles or trunnions 51. On a line perpendicular to the primary axis defined by the trunnions 51 a shaft 52 extends downwardly into a driving mechanism 53 which may consist of a synchronous motor, thereby providing means for rotating the ball 43 on a secondary axis. Mounted on the motor 53 is a gear 54 which is held stationary and concentric relative to the shaft 52. A vertical shaft 55 is extended upwardly through one side of the yoke 50 and has gears 56 and 57 on the ends thereof, the gear 56 rolling in engagement with the gear 54 as the yoke 50 is turned and transmitting rotation through the shaft 55 and the gear 57 to a gear 58 mounted on one of the trunnions 51. Accordingly, each rotation of the yoke 50 on the secondary axis defined by the shaft 52 will, through the gears shown, cause a faster rotation of the body 43 on the primary axis defined by the trunnions 51. As hereinbefore stated, the relative speeds on the primary and secondary axes are controlled by conditions under which the apparatus is to be employed, such for instance, as the size of the screen with relation to the distance of the screen from the scanning device.

I believe that by use of my invention a much greater number of lines in an image can be obtained than has heretofore been accomplished. For example, I may with ease obtain 200 lines and without difficulty should exceed 400 lines when the progress of the art of television may demand the same, as compared with the approximate 120 lines now employed in television images.

I claim as my invention:

1. A device of the character described, including: a primary part mounted so as to turn on a primary axis; a plurality of reflectors disposed on said primary part around said primary axis, said reflectors being elongated in the direction defined by said primary axis, an end portion of each of said reflectors being converged toward said primary axis; means for giving said primary part rotary movement completely around said primary axis; and means for giving said primary part rotary movement completely around a secondary axis disposed at an angle to said primary axis in a timed relation to the rotary movement of said primary part relative to said primary axis.

2. A device of the character described, including: a primary part mounted so as to turn on a primary axis; a plurality of reflectors disposed on said primary part around said primary axis, said reflectors being elongated in the direction defined by said primary axis, and said reflectors being curved so that the ends thereof are converged toward said primary axis; means for giving said primary part rotary movement relative to said primary axis; and means for giving said primary part rotary movement on a secondary axis passing centrally through said primary part and being disposed at an angle to said primary axis and in a timed relation to the rotary movement of said primary part relative to said primary axis.

3. A scanning device, comprising: a member mounted for rotation about two angularly disposed intersecting axes; light directing elements carried by said member; means for continuously rotating said member about one of said axes; and means for simultaneously continuously rotating said member about the other of said axes, whereby the field to be scanned is successively scanned in a plurality of substantially parallel lines with the lines of successive scannings angularly disposed.

4. A scanning device, comprising: a member mounted for rotation about two angularly disposed intersecting axes; light directing elements carried by said member and arranged thereon circumferentially with respect to one of said axes; means for continuously rotating said member about one of said axes and means for simultaneously continuously rotating said member about the other of said axes, whereby the field to be scanned is successively scanned in a plurality of substantially parallel lines with the lines of successive scannings angularly disposed.

5. A scanning device, comprising; a member mounted for rotation about a primary axis; a plurality of light directed elements carried by said member and circumferentially disposed about said primary axis; means for continuously rotating said member about said primary axis; and means for supporting said member adjacent said primary axis and simultaneously continuously rotating said member in timed relation with the rotation about said primary axis about a secondary axis angularly disposed with respect to and intersecting said primary axis, whereby the field to be scanned is successively scanned in a plurality of substantially parallel lines with the lines of successive scannings angularly disposed.

6. A scanning device, comprising; a member mounted for rotation about two perpendicularly disposed intersecting axes; light directing elements carried by said member and circumferentially disposed about one of said axes; means for continuously rotating said member about one of said axes; and means for simultaneously continuously rotating said member about the other of said axes, whereby the field to be scanned is successively scanned in a plurality of substantially parallel lines with the lines of successive scannings angularly disposed.

7. A scanning device, comprising; a member mounted for rotation about a primary axis; a plurality of light directing elements carried by said member and circumferentially disposed about said primary axis; an electric motor positioned within said member for continuously rotating said member about said primary axis; a support for said member mounted for rotation about a secondary axis perpendicularly disposed with respect to and intersecting said primary axis; and means for simultaneously continuously rotating said support about said secondary axis, whereby said member is simultaneously continuously rotated about said primary and secondary axes to scan a field in a plurality of substantially parallel lines with the lines of successive scannings angularly disposed.

MILTON M. STERN.